US012116650B2

(12) United States Patent
Domic Mihovilovic et al.

(10) Patent No.: US 12,116,650 B2
(45) Date of Patent: Oct. 15, 2024

(54) METHOD FOR DISSOLVING METALLOGENICALLY PRIMARY COPPER METALS OBTAINED FROM ORES AND/OR CHALCOPYRITE CONCENTRATES THAT CONTAIN SAME

(71) Applicant: NOVA MINERALIS S.A., Santiago (CL)

(72) Inventors: Tihomir Eduardo Domic Mihovilovic, Región Metropolitana (CL); Esteban Miguel Domic Mihovilovic, Región Metropolitana (CL); Rodrigo Andrés Cortés Cortés, Región Metropolitana (CL)

(73) Assignee: NOVA MINERALIS S.A., Santiago (CL)

( * ) Notice: Subject to any disclaimer, the term of this patent is extended or adjusted under 35 U.S.C. 154(b) by 992 days.

(21) Appl. No.: 17/044,478

(22) PCT Filed: Apr. 6, 2018

(86) PCT No.: PCT/IB2018/052416
§ 371 (c)(1),
(2) Date: Oct. 6, 2020

(87) PCT Pub. No.: WO2019/193403
PCT Pub. Date: Oct. 10, 2019

(65) Prior Publication Data
US 2021/0032723 A1 Feb. 4, 2021

(51) Int. Cl.
*C22B 15/00* (2006.01)
*C22B 3/08* (2006.01)
*C22B 3/20* (2006.01)

(52) U.S. Cl.
CPC ............ *C22B 15/0071* (2013.01); *C22B 3/08* (2013.01); *C22B 3/20* (2013.01); *C22B 15/0069* (2013.01)

(58) Field of Classification Search
CPC .............................. C22B 3/08; C22B 15/0071
See application file for complete search history.

(56) References Cited

U.S. PATENT DOCUMENTS

2005/0044990 A1* 3/2005 Shaw ........................ C22B 3/18
75/711
2017/0335275 A1* 11/2017 Alvarez Rodríguez . C12N 1/20
2017/0335428 A1* 11/2017 Gutiérrez .................. C22B 3/44

FOREIGN PATENT DOCUMENTS

WO WO-9712070 A1 * 4/1997 ......... C22B 15/0067

* cited by examiner

*Primary Examiner* — Samir Shah
*Assistant Examiner* — Sean P. O'Keefe
(74) *Attorney, Agent, or Firm* — Morgan, Lewis & Bockius LLP

(57) ABSTRACT

The present invention relates to an autocatalytic reductive chemical procedure with solid-solid interaction in conditions of supersaturation of salts, via the phenomenon of efflorescence in order to dissolve a copper metal, from a metallogenically primary ore or chalcopyrite concentrate that contains same. The method comprises two steps, referred to as "Reductive Activation Step" and "Dry Autocatalytic Reductive Transformation Step" or efflorescence, which can be repeated as many times as necessary to maximise the extraction of copper or base metal of interest. The invention can also be used for sulphurised base metals such as nickel, zinc, cobalt, lead and molybdenum, among others, regardless of the common impurities of sulphurised ores, as occurs with the presence of arsenic.

15 Claims, 11 Drawing Sheets a)

b)

c)

a)

b)

c)

METHOD FOR DISSOLVING METALLOGENICALLY PRIMARY COPPER METALS OBTAINED FROM ORES AND/OR CHALCOPYRITE CONCENTRATES THAT CONTAIN SAME

FIELD OF THE INVENTION

The present invention corresponds to a chemical auto-catalytic process for the recovery of copper through the reductive solubilization of mineral species existing in nature in the form of primary copper sulfides, composed mainly of chalcopyrite ($CuFeS_2$). In addition, the present invention can also be applied to secondary copper minerals, primary and secondary copper sulfide concentrates and other sulfide based metals such as nickel, zinc, cobalt, lead, molybdenum, among others, regardless of common impurities of sulfide minerals, as occurs in the presence of arsenic.

BACKGROUND INFORMATION

The present invention arises as a response to the technical problem of depletion of copper secondary oxide and sulfide reserves which have been heavily exploited hydrometallurgically during the development of the large-scale mining industry in the world.

Chalcopyrite is a primary copper sulfide, and is the copper ore species that contains more than half of the current copper resources identified worldwide (Wang, 2005). A problem that occurs with chalcopyrite solubilization is that its surface becomes resistant to any chemical or electrochemical reaction due to the formation of a film or passivating layer. As a consequence, the mineral becomes refractory to hydrometallurgical processes, which, together with the gradual depletion of copper reserves in the form of oxides and secondary sulfides, makes that the current operations of leaching, solvent extraction and electro-winning (LX/SX/EW) are out of stock and with idle capacity available.

For chemical leaching processes the passivation effect that is generated on the mineral, mainly due to the presence of elemental sulfur or other insoluble substances containing sulfur and/or insoluble salt complexes such as cuprous chloride species, inhibits the interaction between the leaching solution and the mineral, blocking the oxidation-reduction processes necessary to continue the solubilization of copper (Liu Q., 2017).

In the case of biotechnological processes, like other chemical processes, this type of passivation represents a big problem, but to a greater extent, since the passivation effect is enhanced by the appearance of multiple other passivating agents, such as jarosite, iron oxyhydroxides, polysulfides and elemental sulfur (Hack) R. P. et al., 1995; Stott M B et al., 2000, Ahmadi A. et al., 2010 and Lotfalian M. et al., 2015).

As a consequence, there is currently no hydrometallurgical technology that allows solubilizing copper in a cost-effective manner, from primary sulfide minerals rich in chalcopyrite. For the concentrates, their solubilization has been achieved when the passivating layer is chemically or mechanically destroyed when it begins to cover the surface of the mineral.

The Chilean Copper Commission, published in its report of year 2016, that the production of concentrates will go from a share of 69.2% to 89.9% by 2027, mainly because the deposits are reaching the area of primary sulfides, which are treated mainly by flotation and later by pyrometallurgical processes. On the other hand, the increase in the production of concentrates is not projected today, with an increase in refined products, for that reason a decrease in the value of exports would be expected. In addition, it reported the negative effects of processing this type of concentrates, which involve a series of disadvantages, such as the generation of sulfur dioxide, generation of tailings (environmental liabilities) and high energy consumption, among others (Cochilco, 2016b).

Accordingly, it would be desirable to provide a copper solubilization process that avoids or reduces the passivation phenomenon, and which in turn is directly applicable both to the minerals with primary sulfide contents and to their respective concentrates. This is analogous to the sulfide minerals of other base metals, such as nickel, zinc, cobalt, etc.

DESCRIPTION OF THE PRIOR ART

The state of the art has faced this problem in different manners, which include both chemical leaching and biological leaching processes. Leaching is defined as a selective dissolution of metals from the solids containing them through an aqueous solution (Domic, 2001).

The dissolution of minerals, both chemically and biologically, are heterogeneous phenomena, where the reaction takes place at the interface between a solid and a liquid, also involving solid-liquid-gas and solid-liquid-gas-bacteria interactions.

In general terms, the dissolution of a mineral is governed by 5 stages: (1) diffusion of reagents, (2) adsorption of reagents, (3) chemical reaction between solid and reagents, (4) desorption of the product from the solid, and (5) diffusion of the product of the reaction.

Normally, hydrometallurgical processes, for both oxides and sulfides, are usually controlled by the diffusional stages (Wen C, 1968, Crest, A, 2000, Dixon and Petersen, 2003). On the other hand, heterogeneous reactions involving solid-gas and solid-solid phases at room temperature without the intervention of a liquid phase have an extremely slow reaction rate (Lefebvre R., 2001, Evans K., 2006).

The publication WO2007134343 (Muller et al., 2007) refers to a hydrometallurgical method consisting of two stages: a first non-oxidative stage in acid medium; and a second oxidative stage, involving solid-liquid-gas interaction. This is for the recovery of copper from primary and secondary minerals, which comprises leaching the material in an acid solution with chloride in the presence of dissolved oxygen and cupric ions as oxidizing agents.

Document WO2016179718 (Engdahl et al., 2017), refers to a solid-liquid-gas oxidative method, in an agglomeration drum and to a mineral agglomeration process carried out inside said drum for the pretreatment of minerals, both used mainly in hydrometallurgy. Said drum and method employ a system and a gas recirculation stage as part of the invention.

The patent publication WO02070757 (Hunter, 2002) provides a solid-liquid-gas-bacterial oxidative process for leaching primary copper minerals in the form of chalcopyrite. The method consists in inoculating the mineral with a bacterial culture that oxidizes the sulfide but does not oxidize the ferrous iron to a ferric state. After this stage, the leaching solution is mixed with bacteria which oxidize the ferrous ions, where the favorable conditions for leaching the chalcopyrite are generated, but not in order to avoid its passivation.

The publication WO2016026062 (Alvarez, 2016) provides a solid-liquid-gas-bacterial oxidative process, and it is related to a leaching process of secondary and primary copper sulfides in a chloride-ferric-ferrous medium, with iron-oxidizing bacteria and archaea adapted to high concentrations of chloride ions. In addition, it involves the injection of heated air, in order to raise the temperature and to enhance the dissolution reactions of the mineral.

The publication U.S. Pat. No. 7,491,372 (Faine, 2005) provides a solid-liquid-gas oxidative process, and it is related to a process using calcium chloride, in order to improve the quality of the glomers and thereby the permeability of a cell. Furthermore, the phenomenology of the process is based on favoring the generation of oxidizing agents ($Fe^{3+}$ and $Cu^{2+}$), by the action of oxygen and the copper and iron redox pairing, which causes the solubilization of sulfide minerals.

The present invention differs from the state of the art, in that the solubilization of the primary sulfide (chalcopyrite) is carried out by a reductive autocatalytic process with solid-solid interaction, without the need to inject, promoted by the addition of salts in their reduced state and by over-saturation conditions, through the phenomenon of efflorescence, which is defined as the loss of water from hydration or crystallization, from a mineral or salts by exposure to air. This phenomenon occurs regardless of the presence of common impurities, such as arsenic.

SUMMARY OF THE INVENTION

The present invention relates to a reductive autocatalytic chemical process with solid-solid interaction under over-saturation conditions, in order to solubilize copper from a primary sulfide mineral, particularly chalcopyrite, which contains it. This process consists of two stages, called "Reductive Activation Stage" and "Autocatalytic Dry Reductive Transformation Stage" or Efflorescence. These stages can be repeated as many times as necessary to achieve maximum solubilization of the primary sulfide, either for mineral or concentrates.

These two sequential and/or overlapping stages are governed by reductive solid-solid chemical phenomena, different from each other. For this purpose, a supersaturation condition is used, involving sulfuric acid, iron (II) salts, chloride salts, copper, and water, resulting in the solubilization of copper sulfide of primary origin.

The first stage, or Reductive Activation Stage, corresponds to a non-oxidative, agglomeration and curing stage, under supersaturation conditions, which activates the sulfide surface, facilitating the reducing environment for the second stage of the process, and including the contact between sulfuric acid, water, ferrous ion, copper ion and chloride ion, in an environment of low humidity and low redox potential.

The second stage, or Autocatalytic Dry Reductive Transformation Stage, corresponds to a solid-solid reductive dissolution stage, where the reductive condition is exacerbated by means of the efflorescence phenomenon, in prolonged non-irrigated time periods. This stage of Autocatalytic Dry Reductive Transformation concludes with a first wash of the mineral or concentrate, in order to remove the soluble copper generated and altering to a minimum extent the reductive conditions of the bed. This stage of Autocatalytic Dry Reductive Transformation does not require the injection of air.

The redox potentials which control both stages of Reductive Activation and Autocatalytic Dry Reductive Transformation, which condition autocatalysis, range between 250 and 500 mV, due to the condition of supersaturation of the salts in its reduced state, and because the agents involved as reducing agents are double redox pairs; therefore, they can also act as oxidizing agents in the same potential window.

The reactions and mechanisms involved in the previous stages can occur in any sulfide mineral containing iron and copper, even in minor amounts, wherein it is obvious that they will develop their effect on the dissolution of any other base metal that is in a reduced state, such as metal sulfide. This applies to minerals rich in nickel, zinc, cobalt, molybdenum, etc.

DETAILED DESCRIPTION OF THE INVENTION

Figure 1:
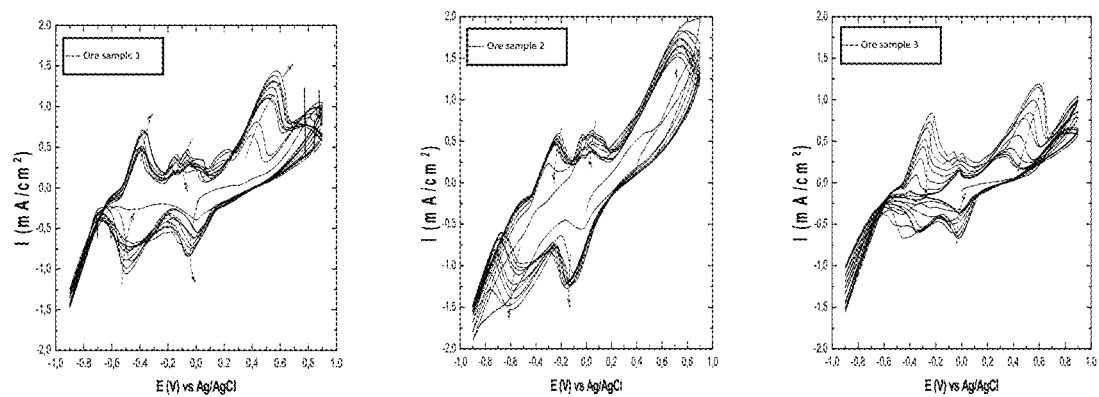
FIG. 1: Cyclic voltammograms in three different primary minerals, using only autocatalytic dry reductive transformation.

The present invention relates to a solid-solid autocatalytic reductive chemical process, which allows solubilizing copper from a primary sulfide mineral or concentrate containing it. In particular, it corresponds to a dissolution process comprising two sequential and/or overlapping stages, which in a novel manner includes two reductive stages; the first named of Reductive Activation; which allows conditioning the environment and the surface of the ore, promoting the solubilization of copper during the second stage of Autocatalytic Dry Reductive Transformation, through the use of salts in their reduced state, low redox potential and the phenomenon of efflorescence, which promotes the condition of over-saturation.

The process comprises the following stages detailed below:

I. Reductive Activation

This stage begins with the exposure of the crushed mineral to a curing and agglomeration process using conventional methods and procedures, which include the addition of circulating process solutions and/or water, sulfuric acid, and variable contents of ferrous iron, chloride and copper from the initial solution or from the recirculation of the process, in such a manner so as to generate a mass of homogeneous and agglomerated mineral. During this addition of reagents, an amount of ferrous iron is added, so that the circulating iron plus the fresh iron reach amounts ranging from 0 to 80 kg of iron sulfate per ton of mineral. The fresh iron can be added in the form of sulfate and/or any other soluble salt of ferrous ion, the anion of which does not interfere adversely in the process, such as an iron hydroxide.

A moderate but variable amount of sodium chloride is also added, ranging up to 80 kg/t of mineral, according to the chloride ion content circulating in the process solutions.

The addition of fresh and/or circulating sulfuric acid ranges between 10 and 50 kg/t of ore, and with a final moisture of the agglomerated mineral ranging between 4 and 15%, depending on the hygroscopicity and granulometric characteristics of the mineral.

The additions of this stage can also be executed in the sole presence of sulfuric acid and of some salt providing the chloride ion. This is due to the fact that the recirculation of solutions from the plant or the incipient dissolution of the mineral can provide the necessary ferrous ions to achieve the effects and advantages of the next stage of autocatalytic dry reductive transformation, and achieve the phenomena of autocatalysis and efflorescence.

This mixture of mineral, circulating solutions of the process, water, acid and chloride, iron and copper ions, is left in a non-irrigated status for a variable period of time, depending on the sulfide contents of the mineral, its hygroscopicity, granulometry and efflorescence, in such a manner so as to allow an activation of its surface with the low humidity present, until it is suitable and conducive to the development of the next Autocatalytic Dry Reductive Transformation Stage. The activation time can vary from 5 to 90 days, or more, depending on the surface reactivity of each mineral or concentrate and its previous conditioning.

II. Autocatalytic Dry Reductive Transformation by Efflorescence

This second stage requires solid-solid, saturation and supersaturation reducing conditions on the chalcopyrite and/or other sulfides present, through the high concentration of circulating salts of ferrous iron, chlorides and copper, promoting autocatalytic reactions, a condition that is enhanced by the efflorescence phenomenon, by prolonged non-irrigation periods.

This Dry Reductive Transformation Stage ends with a washing of the mineral through a continuous or intermittent irrigation of variable duration, using a solution with chloride, ferrous and copper ion contents. Afterwards, a new non-irrigation period begins, of variable time, until completing the reductive transformation.

Next, a new wash is carried out, either continuous or intermittent, again using a solution with chloride, copper and ferrous ions, conditioned according to the needs, with an addition of chloride and ferrous salts, depending on the amount that is lost during the successive irrigations, and on the superficial characteristics available, which will vary as described:

a) Chloride concentrations between 10 and 150 g/L.
b) Iron concentrations between 1 and 50 g/L.
c) Net irrigation rate between 4 and 10 L/h/m$^2$.
d) Efflorescence time of 5 to 90 days, or more, depending on the reactivity of the surface of the mineral or concentrate.

The Reductive Activation and Autocatalytic Dry Reductive Transformation stages can be repeated as many times as necessary, in order to promote efflorescence again, to reach the maximum solubilization of the copper contained in the mineral or concentrates.

In a preferred embodiment, the invention relates to a process for the solubilization of metals from minerals and/or concentrates of sulfide minerals of origin and metallogenically primary containing them, which comprises the following sequential and/or overlapping stages:

I) Reductive Activation stage that corresponds to a non-oxidative stage including the contact of the mineral or mineral concentrate with chloride ions in acidic environment, and with recirculating solutions of the same process which contain or may contain chloride, ferrous iron and copper ions, always in an environment of low potential and minimum total humidity; and II) Autocatalytic Dry Reductive Transformation stage, solid-solid, where reductive conditions are enhanced by means of the efflorescence phenomenon that promotes an over-saturated environment of chloride, ferrous iron and copper ions, causing the mineral or chalcopyrite concentrate be reduced to mineralogical species which are solubilized by acid and chloride, this stage concludes with a washing with process solutions that allows removing the products from the reaction.

In an embodiment of the invention, in stage I ferrous iron is added so as to have an amount between 10 to 50 kg of ferrous ion per ton of material.

In another preferred embodiment of the invention, in step I the ferrous ion can be added in the form of sulfate and/or any other soluble salt, the anion of which does not adversely interfere with the process, such as ferrous hydroxide, and/or through the contents of ferrous ion of the process recirculation solutions.

In one embodiment of the invention, in step I the chloride is added in the form of sodium chloride or chloride ion in the curing and agglomerating solution.

In a preferred embodiment of the invention, in step I the amount of sodium chloride that is added ranges from 25 to 80 kg per ton of material.

In an embodiment of the invention, in step I the addition of sulfuric acid ranges from 5 to 50 kg per ton of material.

In an embodiment of the invention, in stage I the final moisture of the agglomerated mineral must be less than 10%.

In a preferred embodiment of the invention, in stage I the final moisture of the agglomerated mineral should be between 4 and 8%.

In an embodiment of the invention, in stage II the final moisture of the agglomerated mineral must be less than 10%.

In a preferred embodiment of the invention, in stage II the final moisture of the agglomerated mineral should be between 4 and 8%.

In another embodiment of the invention, the redox potentials controlling both stages of Reductive Activation and Autocatalytic Dry Reductive Transformation which condition autocatalysis range between 250 and 500 mV.

In another embodiment of the invention, after the entry of water, acid and salts in stage I the mixture obtained is left in a non-irrigated status to activate the surface of the mineral for a time ranging from 5 to 90 days, promoting the second stage of Autocatalytic Dry Reductive Transformation, through the phenomenon of efflorescence, and low redox potential.

In another embodiment of the invention, after stage II the mineral is washed by a continuous or intermittent irrigation with a solution containing chloride, ferrous and copper ions.

In one embodiment of the invention stages I and II may be repeated one or more successive times, depending on the existence of metal ions of interest to be solubilized.

In an embodiment of the invention after stage II the washing solutions are drained to enable the continuation of a new stage of autocatalytic dry reductive transformation, in a reductive environment with minimum total humidity.

In another embodiment of the invention the metals to be solubilized are selected from the group which includes copper, zinc, nickel, molybdenum, cobalt, lead, among others.

In a preferred embodiment of the invention the metal to be solubilized is copper.

In one embodiment of the invention the solubilization of copper may likewise occur from sulfide ores with arsenic contents and/or arsenic-containing sulfide ore concentrates.

In an embodiment of the invention because before stage I the mineral is fractured, with the purpose of maximizing the surface available for contact between the species of value and the reagents involved in the process, and thus favoring the diffusion of the latter to the interior of the particles.

In an embodiment of the invention the stages I of Reductive Activation and II of Autocatalytic Dry Reductive Transformation can be applied to copper concentrates.

In the procedure described both in general and in its preferred modes the ferrous ion acts as a regulator of the redox potential, generating the reducing environment required for the Autocatalytic Dry Reductive Transformation stage.

Likewise, chloride and ferrous ions can be incorporated to the process in the form of sodium chloride and a ferrous iron salt, or through the use of process recirculation solutions containing chloride, ferrous and copper ions.

WORKING EXAMPLES

Example 1: Obtaining Cyclic Voltammograms in Three Different Primary Minerals, Using Only Autocatalytic Dry Reductive Transformation In order to visualize the REDOX phenomena which took place during the autocatalytic dry reductive transformation stage (Stage II), the cyclic voltammetric technique was used. This electrochemical technique consists of applying a cycle of voltages (millivolts) over time, where the potentiostat measures the current per unit area ($mA/cm^2$). During this cycle, it presents a voltammetric curve that shows the interaction between the mineral (in the dropsen electrode) and the supersaturated leaching solution (electrolyte) by means of the different oxide-reduction processes that occur. For this purpose, three carbon paste dropsen electrodes were prepared with different chalcopyritic concentrates (mineral 1, mineral 2 and mineral 3) and mixed with graphite as the conductive medium. In addition, a solution of 9 g/L iron sulfate heptahydrate salts ($FeSO_4 \times 7H_2O$), 10 g/L sodium chloride (NaCl) and a 2 M concentration of sulfuric acid ($H_2SO_4$) was prepared.

For the tests carried out, the potential sweep used is −0.9 V to +0.9 V, with a sweep rate of 20 mV/s, for 5 minutes at 20° C.

The results are shown in FIG. 1, which allow concluding that the oxidation peaks have a similar tendency for the 3 minerals and the same cathodic behavior with two reduction peaks for all the measured chalcopyrites, which has been described as phenomena of reduction of chalcopyrite to less refractory species (Weimin Z. et al., 2013). Although it has not been promoted, the second stage is present in an incipient form through the notorious expansion of each new voltammetric cycle, reflecting thus the autocatalytic nature of the reactions of this second stage.

Example 2: Obtaining Cyclic Voltamperograms with Mineral 1, in Terms of Temperature, Using Only the Autocatalytic Dry Reductive Transformation In order to obtain the results shown in FIG. 2, the same conditions and parameters as the cyclic voltammograms of FIG. 1 were used, with the difference that only mineral 1 was used, which was subjected to three different temperatures 20, 32 and 40° C.

Figure 2:
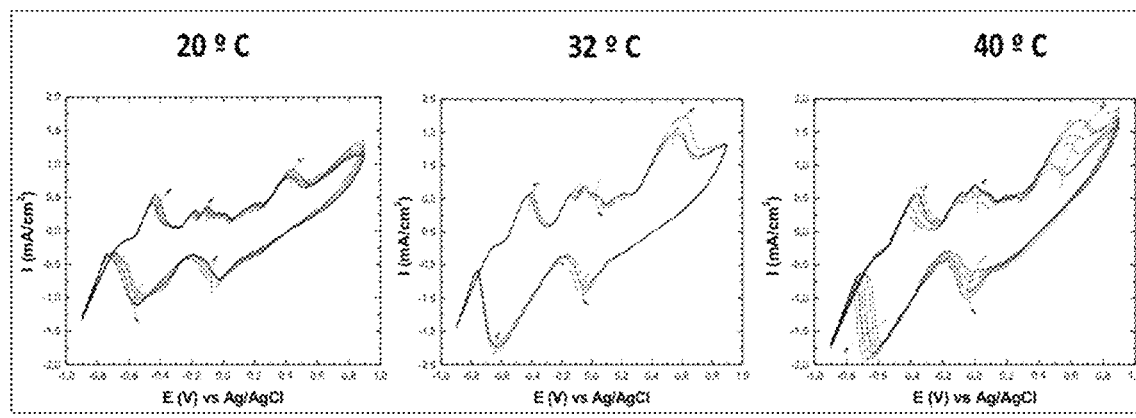
FIG. 2: Cyclic voltammograms with mineral 1, in terms of temperature, using only autocatalytic dry reductive transformation.

From FIG. 2, it can be seen how the increase in temperature for the same mineral has a smaller effect in the peaks generated in the anode and in the cathode, especially for temperatures of 32 and 40° C. This small difference achieved by increasing the temperature can be explained by the fact that the proposed technology obeys a reductive process, which is not totally dependent on temperature.

Example 3: Obtaining Cyclic Voltammograms in Three Different Primary Minerals, Including Reductive Activation and Autocatalytic Dry Reductive Transformation In order to obtain the results shown in FIG. 3, the same conditions and parameters were used as for the autocatalytic dry reductive transformation, shown in FIG. 1, with the difference that the reductive activation stage was used for this test for 7 days, using a saturated solution of 50 g/L sodium chloride, 25 g/L ferrous sulfate and a 2M concentration of sulfuric acid. Once the 7 days of activation were completed, the cyclic voltammetry was carried out under autocatalytic dry reductive transformation conditions.

Figure 3:
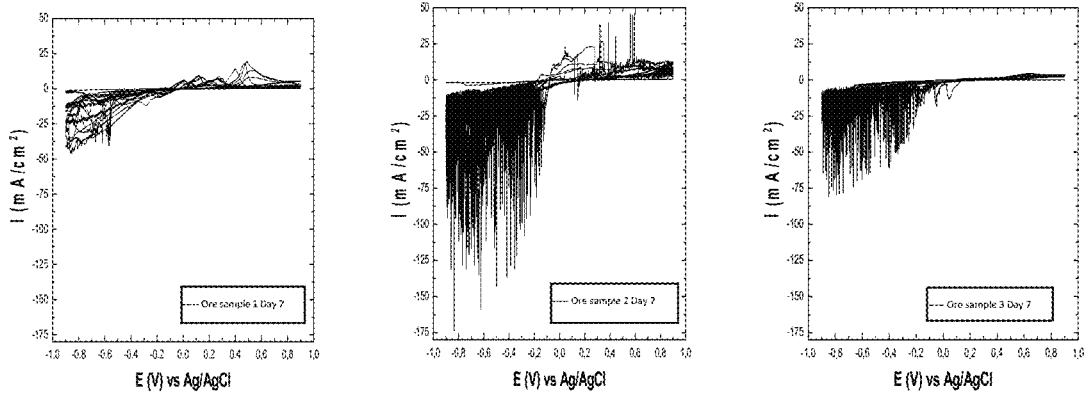
FIG. 3: Cyclic voltammograms of three different primary minerals, including the Reductive Activation stage and the autocatalytic dry reductive transformation.

The results which derive from FIG. 3 show how the reductive activation stage on the three minerals has an activation effect, enhancing the phenomena in the anodic and cathodic zones, but mainly the process of reduction of chalcopyrite, significantly increasing the current per unit area.

The difference between the cathodic peaks of the voltammograms which include the activation stage, compared to those obtained without activation, is almost 35 times, which is a marked demonstration that the Reductive Activation stage provokes a destabilization and the ideal conditions in the surface of chalcopyrite, that encourages the Autocatalytic Dry Reductive Transformation.

Example 4: Obtaining Cyclic Voltammograms in Three Different Primary Minerals, Including Reductive Activation and Reductive Transformation In order to obtain the results shown in FIG. 4, the same conditions and parameters as the cyclic voltammograms of FIGS. 1 and 3 were used, with the difference that for this test the reductive activation stage was used for 7 days, increasing the concentration of the sodium chloride salts to 100 g/L, ferrous sulfate to 50 g/L and a 2M concentration of sulfuric acid.

Figure 4:
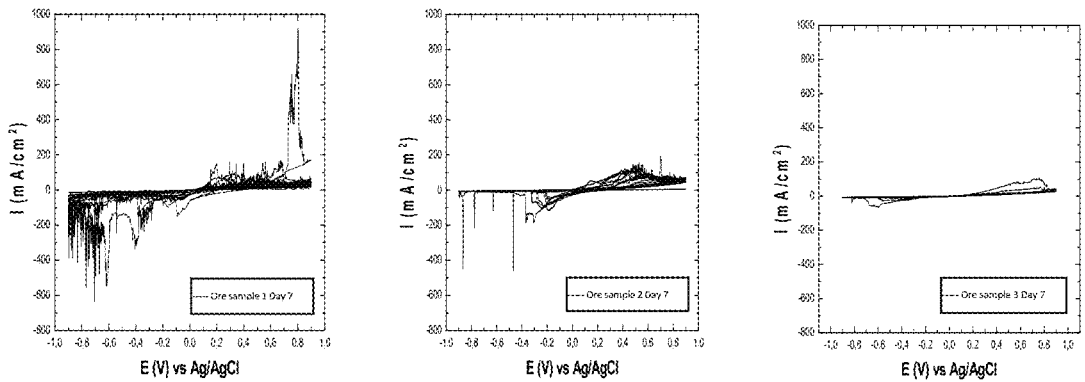
FIG. 4: Cyclic voltammograms in three different primary minerals, including the Reductive Activation stage and the Autocatalytic Dry Reductive Transformation, using concentrations of chloride ions higher than those of iron.

FIG. 4 shows the cyclic voltammograms for the three chalcopyrite minerals, and it can be seen that the increase in the concentrations of salts in the reductive activation stage promotes the cathodic phenomena of Autocatalytic Dry Reductive Transformation.

Example 5: Identification of the Autocatalytic Dry Reductive Transformation Phenomenon, by Cathodic Linear Sweep in a Primary Mineral, Varying the Reductive Activation Time In order to visualize and quantify the reductive effect of a saturated solution on a mineral (chalcopyrite), the linear sweep technique is used cathodically. This is an electrochemical technique that expresses the phenomena which have occurred cathodically in units of current per unit area (I: $mA/cm^2$).

The process consists of cathodically passing a potential sweep of 20 mV/s, for 2 minutes, in a 0 to 1 V potential window, using the leaching solution as a conductive medium, which interacts with the surface of the mineral.

Figure 5:
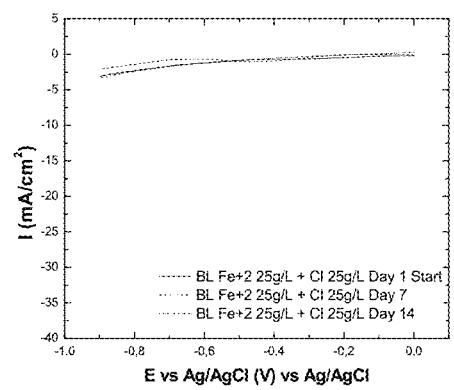
FIG. 5: Identification of the Autocatalytic Dry Reductive Transformation phenomenon, by means of a cathodic linear sweep in a primary mineral, varying the reductive activation time.
Figure 5:
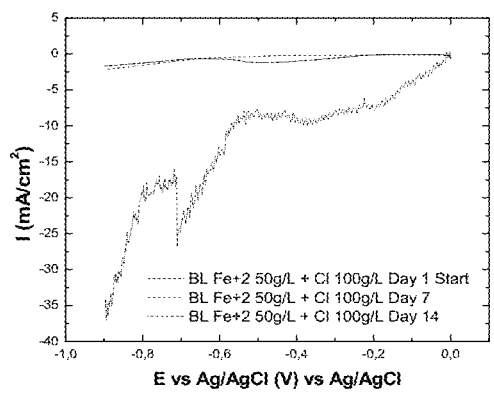
Figure 5:
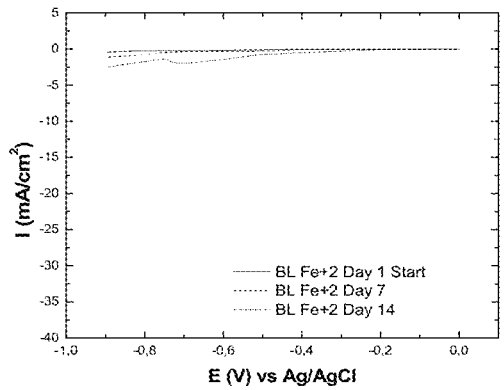

In order to obtain the results shown in FIG. 5, the same electrode preparation conditions as for FIG. 1 were used. The reductive activation time period was 1, 7 and 14 days, using two salt concentration conditions: a) 25 g/L of ferrous iron and 25 g/L of chloride; b) 50 g/L of ferrous iron and 100 g/L of chloride; and c) 20 g/L of ferrous ion without addition of chloride ion. All conditions used 2M sulfuric acid.

The solution used for the linear sweep was 9 g/L of ferrous iron sulfate, 10 g/L of sodium chloride and a 2M concentration of sulfuric acid.

The results of the linear sweep in FIG. 5 show that after 14 days of reductive activation under the $[Cl^-]>[Fe^{2+}]$ condition, a greater autocatalytic dry reductive transformation is achieved, confirming the reductive phenomenon as the dissolution mechanism of chalcopyrite.

Example 6: Evaluation of the Potential at the Solid and Liquid Interface Over Time, by Linear Potential Sweep, During the Reductive Activation Stage The linear potential sweep is an electrochemical technique that allows evaluating the REDOX potential generated at the interface between a solid and a liquid (mineral electrode and solution of Reductive Activation and Autocatalytic Dry Reductive Transformation) over time.

Figure 6:
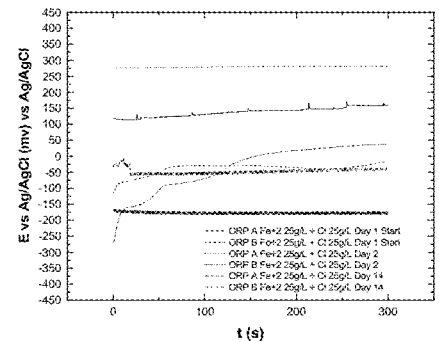
FIG. 6: Evaluation of the potential at the solid and liquid interface over time, by linear potential sweep, in the Reductive Activation stage.
Figure 6:
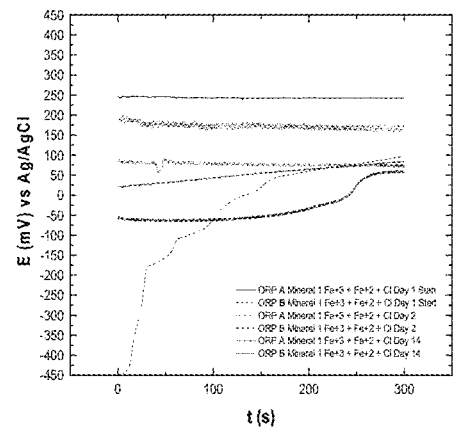
Figure 6:
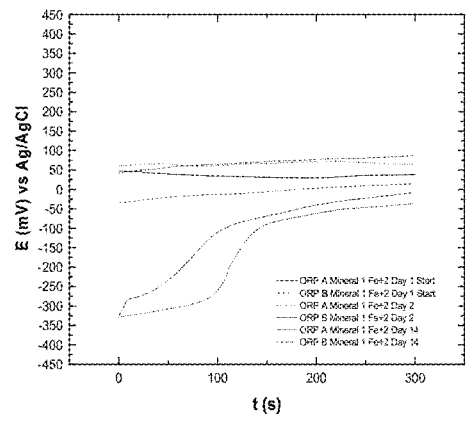

In order to obtain the results shown in FIG. 6, the same conditions were used as for obtaining the results of FIG. 5, with the difference that for this test, the reductive activation stage was used for 1, 2 and 14 days, in addition to using three different salts conditions: a) 25 g/L of ferrous iron and 25 g/L of chloride; b) 50 g/L of ferrous iron, 100 g/L of chloride and 0.1 g/L of ferric ion; and c) 20 g/L ferrous ion without addition of chloride. All conditions used 2M sulfuric acid.

Once the reductive activation period was concluded, the linear sweeping of potential was carried out with the activated electrode and an electrode that was not subjected to activation, as a control. The electrodes were moistened with the solution containing 9 g/L of iron sulfate, 10 g/L of sodium chloride and a 2M concentration of sulfuric acid.

The linear potential sweep of FIG. 6 shows that the potential at the solid-liquid interface decreases for all cases, both for a) and b). However, the greatest decrease in the surface potential of the mineral was obtained under the condition c), where only ferrous ion was used, confirming that this condition has as a primary role, maintaining the adequate potential for the autocatalytic dry reductive transformation stage.

Example 7: Extraction of Copper from a Primary Sulfide Rich in Chalcopyrite in Terms of Time The results were obtained using a low grade primary copper sulfide mineral (0.24%), which was subjected to a traditional crushing process to a particle size 100% less than ½ inch.

Figure 7:
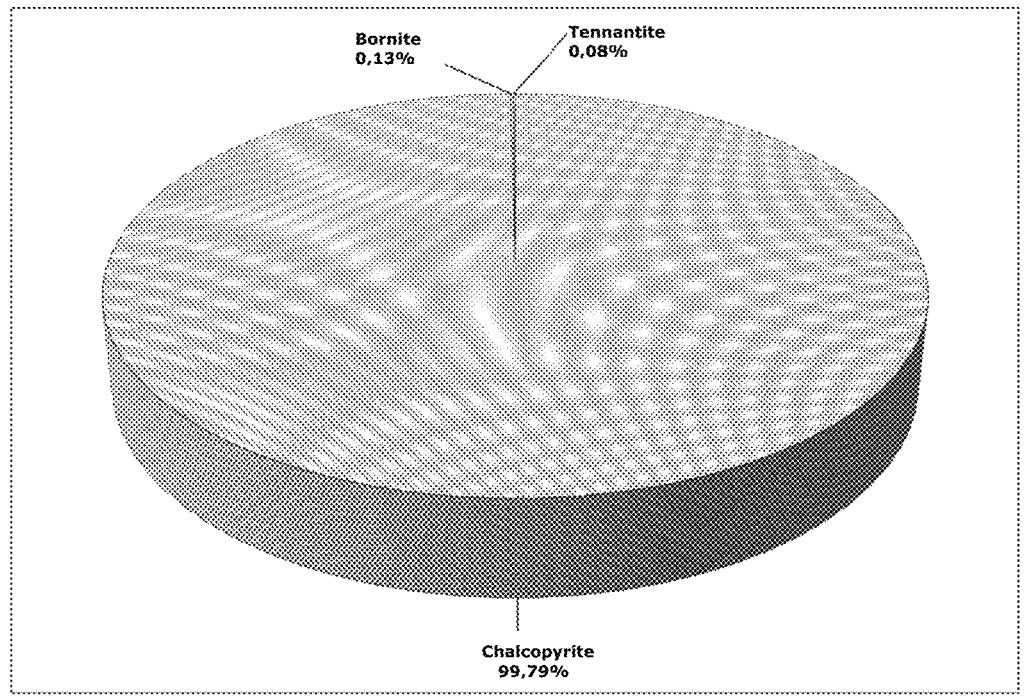
FIG. 7: Distribution of mineralogical copper species of a primary mineral under study.

A mineralogical analysis (see FIG. 7) indicated that copper in this mineral is contained in the following mineralogical species:
99.7% of copper is found as chalcopyrite;
0.3% of copper is found as bornite.
The conditions of the test shown in FIGS. 8 and 9 were the following:
a) Addition of 80 kg/t of sodium chloride during curing;
b) Addition of 40 kg/t of ferrous sulfate during curing;
c) Addition of 42 kg/t of sulfuric acid during curing;
d) Efflorescence time of 90 and 150 days;
e) Size distribution 100% under half an inch; and
f) Moisture of 7%.

The temperature used ranges from 15 and 35° C., depending on the acid concentration, characteristic of the gangue and the moisture in the reductive activation stage. This condition was valid for all the tests developed with crushed minerals and concentrates.

Figure 8:
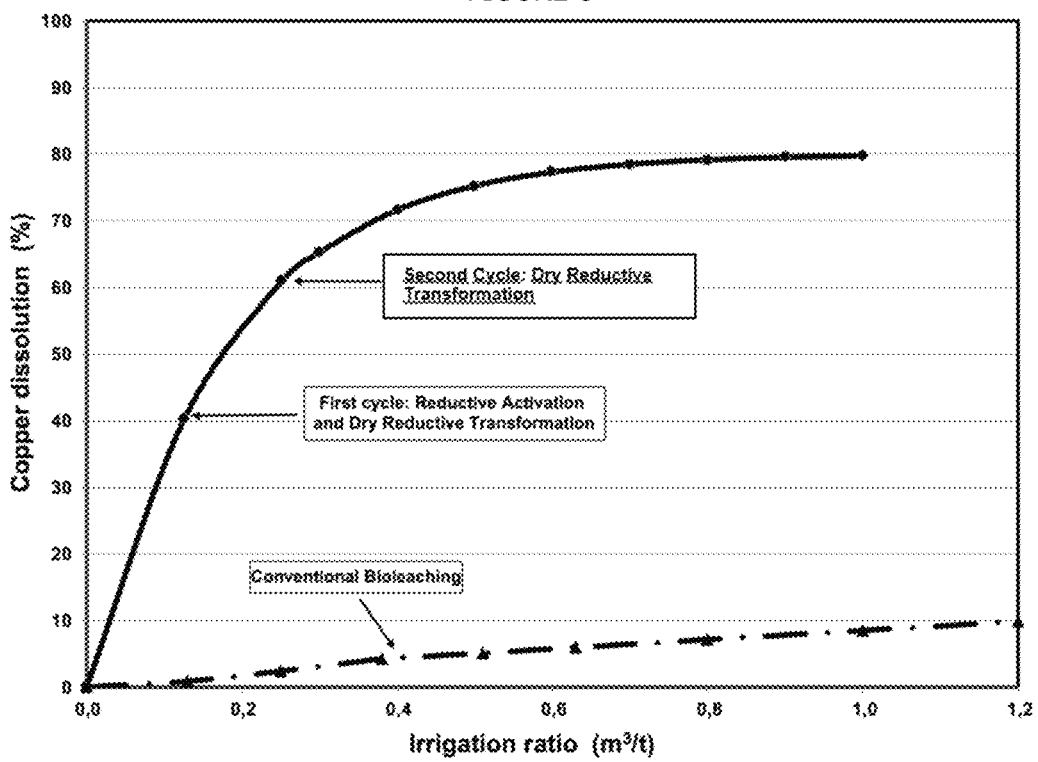
FIG. 8: Comparison of the copper extraction of a primary sulfide in terms of the irrigation ratio, between a conventional bioleaching and the present invention.
Figure 9:
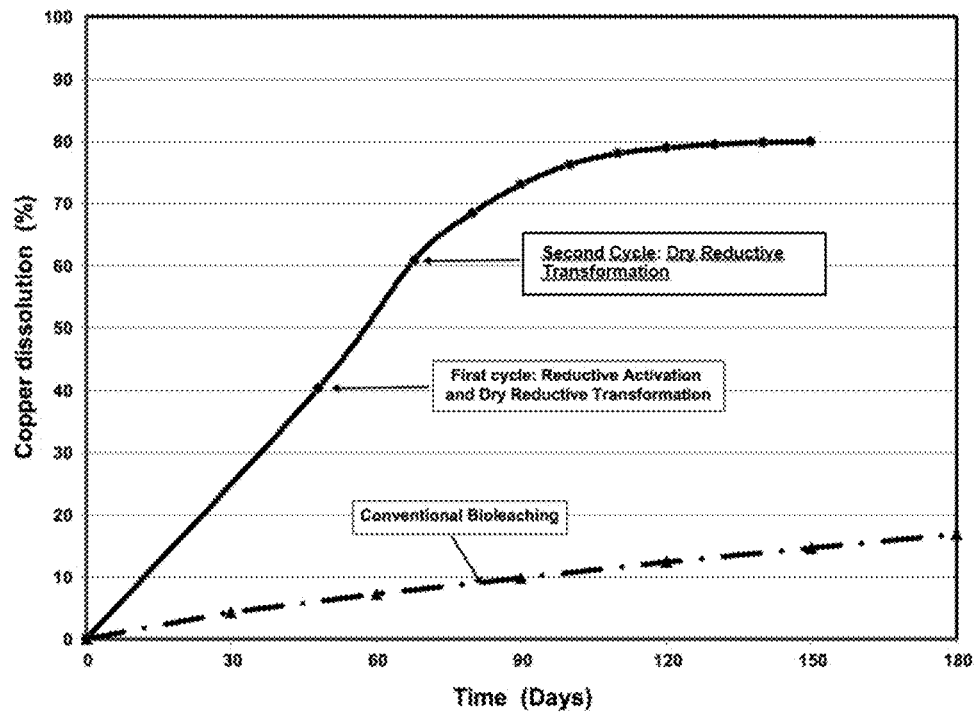
FIG. 9: Comparison of the copper extraction of a primary sulfide in terms of time, between a conventional bioleaching and the present invention.

In both FIGS. 8 and 9, the test is compared to a classical bioleaching that was developed with the same primary mineral, in parallel, under the following conditions:
a) Addition of 14 kg/t of sulfuric acid during curing.
b) Initial resting time of 15 days.
c) Size distribution 100% under half an inch.
d) Concentration of $1 \times 10^8$ cells per mL.
e) Intermittent irrigation 12×12 hours during the test.

By using the best Reductive Activation condition [Cl$^-$]> [Fe$^{2+}$] in a low grade primary mineral, where more than 99% of the copper is in the form of chalcopyrite, it is possible to achieve in the two stages of the proposed method, Reductive Activation and Autocatalytic Dry Reductive Transformation, a remarkably high solubilization of copper contained as chalcopyrite. In contrast, for classical bioleaching, only a very low level of extraction was achieved. These experimental results can be seen in FIGS. 8 and 9.

In view of FIG. 8 it is also possible to conclude that an appropriate management of the irrigation rate used in the proposed method will significantly reduce the volumes of water involved in the process, which will advantageously lead to a reduction in operating costs and in the generation of low flows of solutions with higher copper content destined to the later stages of SX/EW.

Example 8: Extraction of Copper from a Primary Sulfide Rich in Chalcopyrite, During Autocatalytic Dry Reductive Transformation in Terms of Particle Size The mineral containing a primary copper sulfide in the form of chalcopyrite was crushed to 100%–½" and the size fractions –½"/+¼", –¼/+#10 and –#10 were quantified and recorded. The mineral prepared in this manner was cured and agglomerated using the following conditions:
  a) Addition of 60 kg/t of sodium chloride;
  b) Addition of 20 kg/t of ferrous sulfate;
  c) Addition of 28 kg/t of sulfuric acid; and
  d) Moisture of 10%.

Then, the mineral was loaded and subjected to an efflorescence time of 90 days, at which time it was subjected to a 12-hour irrigation at a rate of 5 L/hrm$^2$ with acidulated water at a pH of 1. The effluent solution was recovered and analyzed for its copper content.

Figure 10:
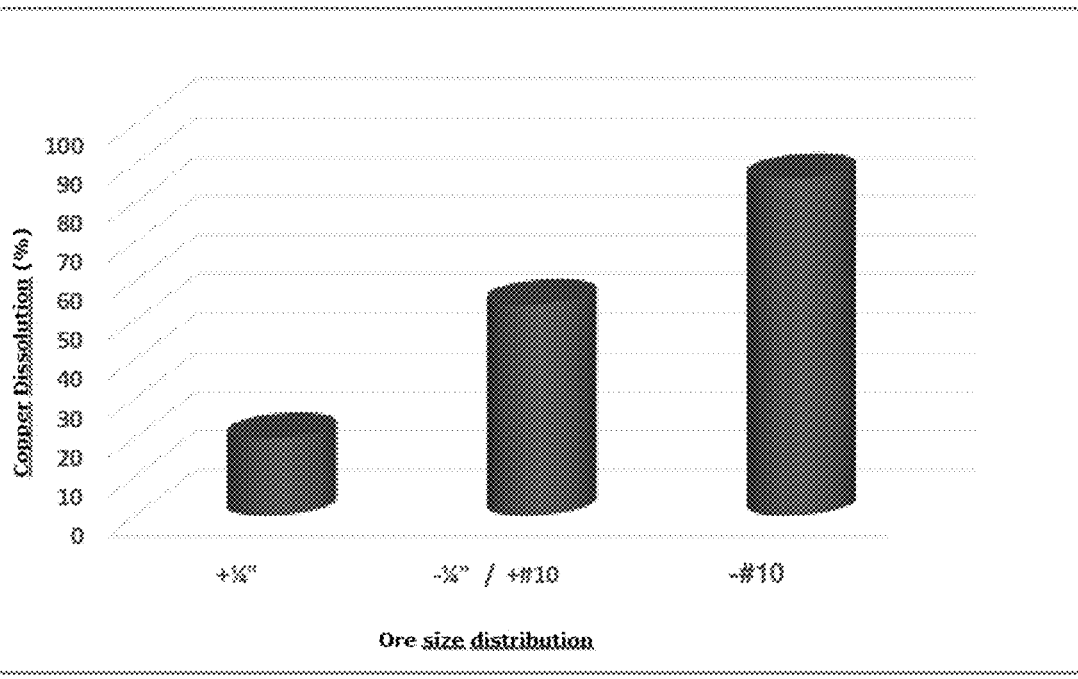
FIG. 10: Extraction of copper from a primary sulphide in the Autocatalytic Dry Reductive Transformation stage in terms of particle size.

The leach ores of the experience were unloaded, dried and separated in each of the size fractions indicated above, allowing comparing in this manner the copper contents of the head mineral with the leach ores of each fraction, which allowed depicting the graph of the FIG. 10.

In view of FIG. 10 it can be concluded that the smaller the particle size, the greater the copper extraction, although for the thicker mineral a large proportion of copper is obtained even being in the form of chalcopyrite.

Example 9: Extraction of Copper in Terms of the Efflorescence Time in the Autocatalytic Dry Reductive Transformation Stage and its Repetition The mineral containing a primary copper sulfide in the form of chalcopyrite was crushed to an ore size 100% under ½". With this mineral, 6 samples were agglomerated and cured under the following conditions:
  a) Addition of 80 kg/t of sodium chloride;
  b) Addition of 10 kg/t of ferrous sulfate;
  c) Addition of 14 kg/t of sulfuric acid;
  d) Moisture of 8%.

Next, the columns were loaded and subjected to a first and second efflorescence period, with washes at the end of each of these periods at a rate of 10 L/hr*m$^2$ for 24 hours. The variable efflorescence times for each test were the following:
  a) Time of the first efflorescence period: 3, 7, 14, 32, 46 and 61 days.
  b) Time of the second efflorescence period: 32, 32, 28, 10, 30 and 30 days.

Figure 11:
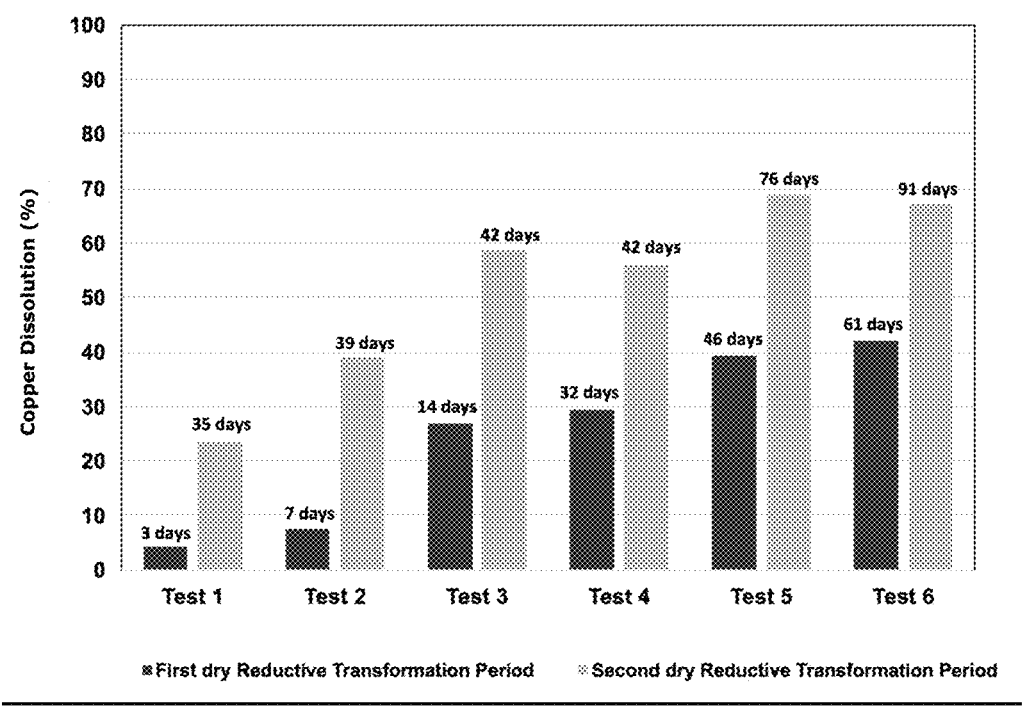
FIG. 11: Extraction of copper in terms of the efflorescence time and repetition of Autocatalytic Dry Reductive Transformation.

The results of this test are shown in FIG. 11, which allow concluding that the efflorescence time promotes the solubilization of the primary sulfide, through the autocatalytic dry reductive transformation. In addition, as the generation of products of the reduction reactions increases, copper extraction is greater, which allows inferring the autocatalysis of the process. On the other hand, when applying a second efflorescence period, it can be concluded that the autocatalytic dry reductive transformation stage can be applied as many times as necessary to sequentially solubilize the primary sulfide present in the form of chalcopyrite.

Example 10: Extraction of Copper from a Primary Sulfide Rich in Chalcopyrite in Terms of Acid Concentration During Reductive Activation The mineral was crushed to a size 100% under % inches. Three samples were cured and agglomerated under the following conditions:
  a) Addition of 25 kg/t of sodium chloride;
  b) Addition of 10 kg/t of ferrous sulfate;
  c) Addition of a variable dose, for each test, of 14, 28 and 42 kg/t of sulfuric acid; and
  d) Moisture of 6%.

Then, the samples were loaded into columns and maintained for a 45-day efflorescence time. Afterwards, the columns were irrigated with an acidulated solution at a pH of 1 for 12 hours at a rate of 5 L/hr*m$^2$, and the effluent solutions were analyzed by copper, thus being able to compare the results of the tests subjected to different doses of sulfuric acid during curing.

Figure 12:
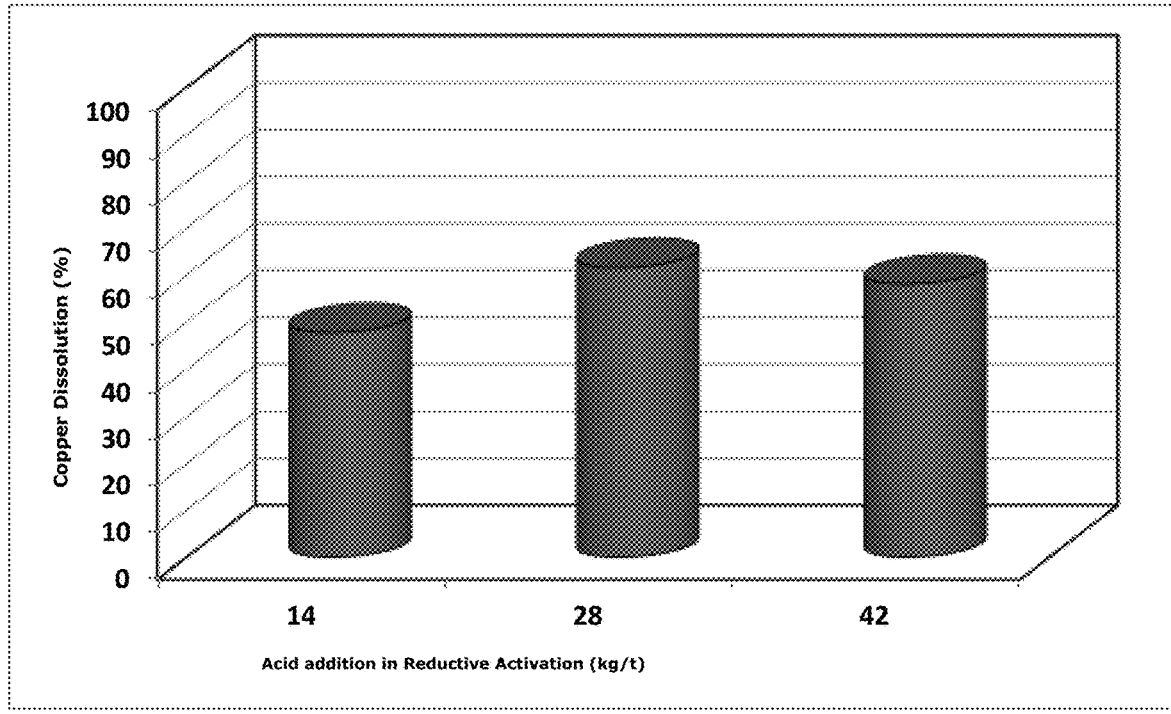
FIG. 12: Extraction of copper from a primary sulfide in terms of the acid concentration in the Reduction Activation stage.

The results obtained are shown in FIG. 12, which allow concluding that an increase in acid concentration during the curing stage has a beneficial effect in the extraction of copper.

Example 11: Extraction of Copper in Terms of Conventional Crushing Versus HPGR Crushing Four composites of 150 kg of primary mineral were formed, which had the mineralogical characteristics indicated in the graph of FIG. 7. Three of these composites were mechanically prepared using a high pressure roller crusher, known in the industry as HPGR (High Pressure Grinding Rolls). The pressures used in each test were 40, 60 and 80 kg/cm$^2$.

The fourth composite was subjected to a conventional crushing and, therefore, said compound was used as a comparison test of those made with the mineral prepared with an HPGR crusher.

The conditions of the four tests were the following:
  a) Addition of 60 kg/t of sodium chloride;
  b) Addition of 80 kg/t of ferrous sulfate;
  c) Addition of 42 kg/t of sulfuric acid; and
  d) Moisture of 7%.

The efflorescence period was 45 days, after which irrigation was applied with an acidulated solution at a pH of 1, for 12 hours at a rate of 5 L/hr*m$^2$, and the effluent solutions were assessed for copper, allowing thus to compare the results of tests with minerals prepared under different crushing conditions.

Figure 13:
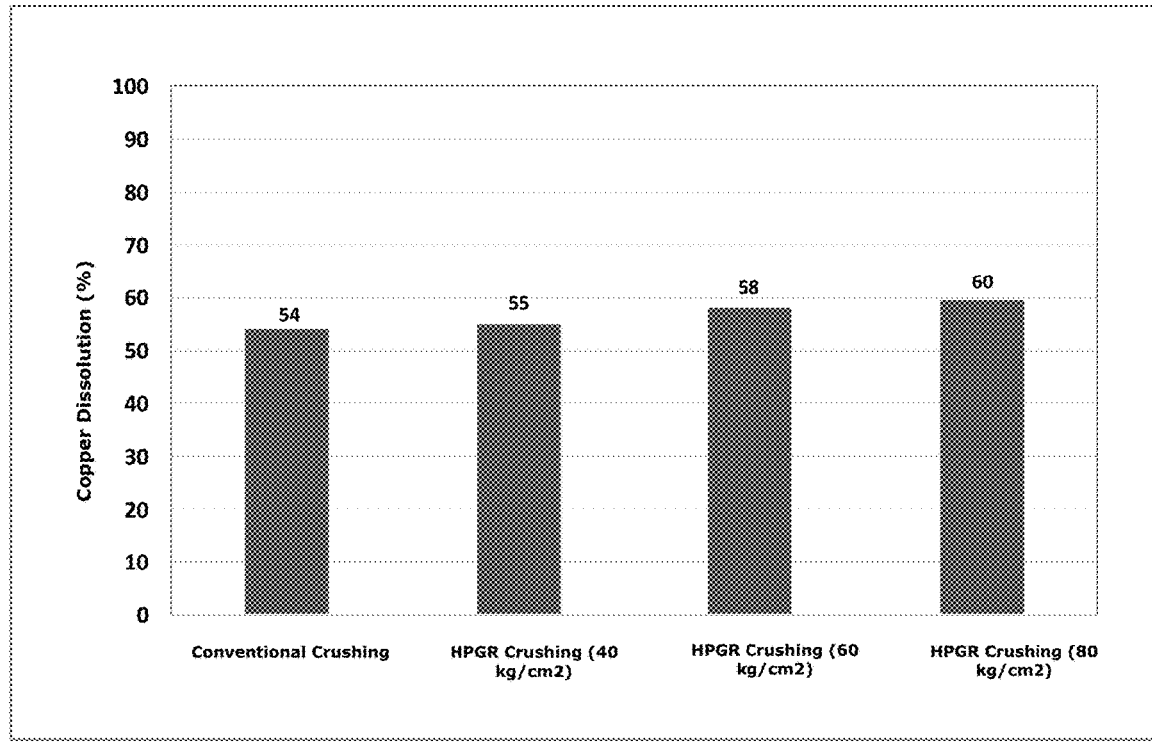
FIG. 13: Extraction of copper in terms of the type of traditional crushing versus HPGR crushing.

The results obtained by comparing the two types of crushing are shown in FIG. 13, where it can be seen that the mineral that was subjected to HPGR crushing, under different pressure conditions, has a higher extraction of copper than the mineral that only was applied with a conventional crushing. This is due to the higher level of fracturing that the HPGR provokes in the mineral, which allows the chalcopyrite particles, originally isolated from the environment, to be reached by the salts and acid for their solubilization.

Example 12: Extraction of Copper from a Chalcopyrite Concentrate in Terms of Time, Using Reductive Activation and Autocatalytic Dry Reductive Transformation The results of the tests with a rougher concentrate were obtained from tests developed using 100 g of copper concentrate, with 12.4% of total copper and 96% of copper as chalcopyrite. This concentrate was subjected to Reductive Activation, through a cure that involved the addition of:
  a) 60 kg/t of sulfuric acid;
  b) 60 kg/t of sodium chloride; and
  c) 5 kg/t of ferrous sulfate.
  d) Moisture lower than 10%.

Figure 14:
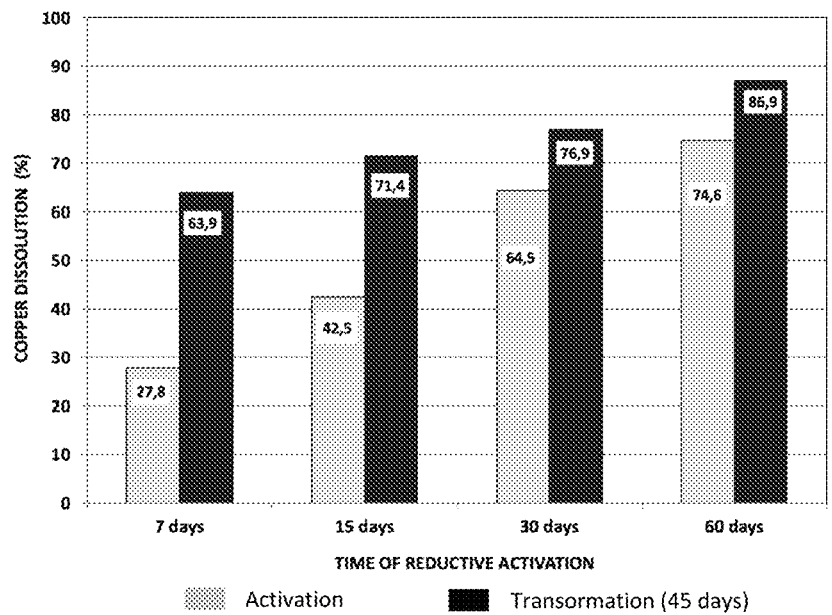
FIG. 14: Extraction of copper from a chalcopyrite concentrate in terms of time, using the Reductive Activation and Autocatalytic Dry Reductive Transformation stages.

After the Reductive Activation, the Dry Reductive Transformation was carried out through the efflorescence phenomenon for 30 days. Once the Autocatalytic Dry Reductive Transformation was completed, the concentrate was washed for 5 minutes with 500 mL of washing solution, containing 15 g/L of sulfuric acid, 120 g/L of sodium chloride, 20 g/L of ferrous sulfate, and 1 g/L of copper. The extraction of copper obtained through Reductive Activation and Autocatalytic Dry Reductive Transformation can be seen in FIG. 14.

Example 13: Extraction of Copper from a Primary Sulfide, Using Different Concentrations of Sodium Chloride Salts, During Reductive Activation and Autocatalytic Dry Reductive Transformation The mineral containing a primary copper sulfide in the form of chalcopyrite was crushed to a size 100% under ½". With this mineral, 4 samples were agglomerated and cured under the following conditions:
  a) Addition of 0, 25, 50 and 80 kg/t of sodium chloride;
  b) Addition of 10 kg/t of ferrous sulfate;
  c) Addition of 42 kg/t of sulfuric acid;
  d) Moisture of 10%.

Then, the samples were subjected to a efflorescence time for 45 days, after which irrigation was applied with an acidulated solution at a pH of 1 for 12 hours at a rate of 5 L/hr*m², and the effluent solutions were assessed for copper, allowing thus comparing the results of tests with different doses of sodium chloride in the curing stage.

Figure 15:
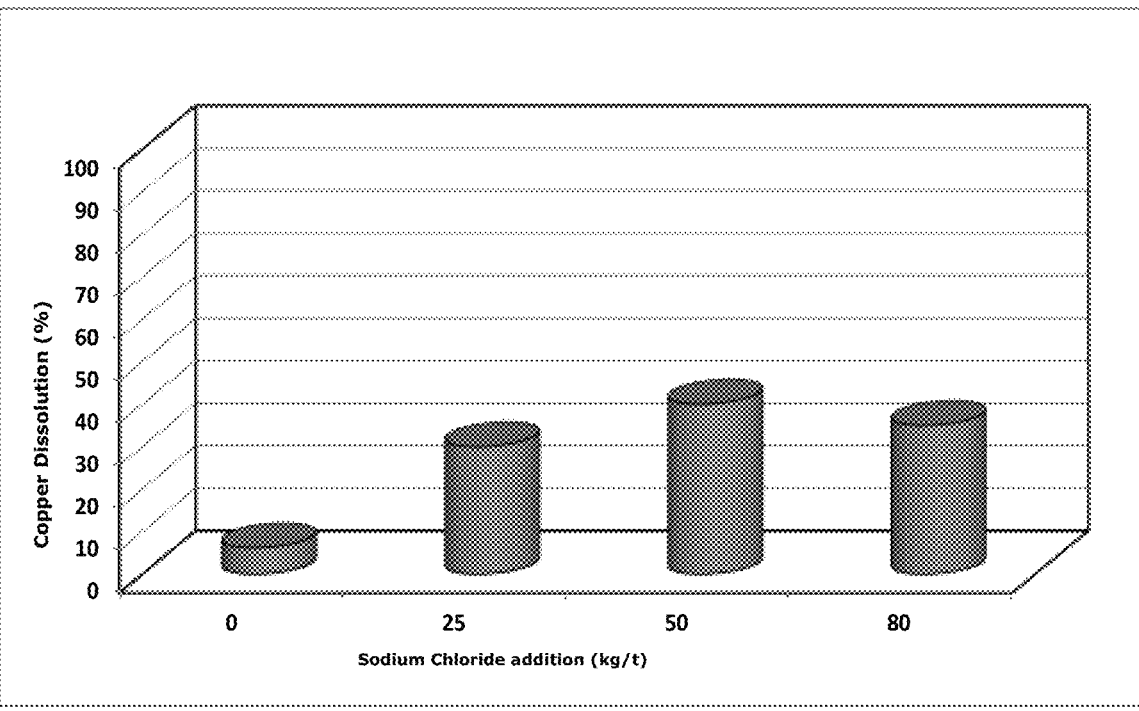
FIG. 15: Extraction of copper from a primary sulfide, using different concentrations of sodium chloride salts, in the stages of Reductive Activation and Autocatalytic Dry Reductive Transformation.

The results obtained in this test are shown in FIG. 15, allowing concluding that the addition of sodium chloride in the curing stage has a beneficial effect on the dissolution of the primary sulfide in the form of chalcopyrite. However, it can be observed that, in the case of this sample, an addition of 50 kg/t allows obtaining the highest copper extraction.

Example 14: Extraction of Copper from a Primary Sulfide, Using Different Concentrations of Ferrous Sulfate, During Reductive Activation and Autocatalytic Dry Reductive Transformation The mineral containing a primary copper sulfide in the form of chalcopyrite was crushed to a size 100% under ½". With this mineral, 4 samples were agglomerated and cured under the following conditions:
  a) Addition of 25 kg/t of sodium chloride;
  b) Addition of 0, 40, 60 and 80 kg/t of ferrous sulfate;
  c) Addition of 42 kg/t of sulfuric acid;
  d) Moisture of 6%.

Then, the samples were subjected to a efflorescence time for 45 days, after which irrigation was applied with an acidulated solution at a pH of 1 for 12 hours at a rate of 5 L/h*m², and the effluent solutions were assessed for copper, allowing thus to compare the results of tests with different doses of ferrous sulfate in the curing stage.

Figure 16:
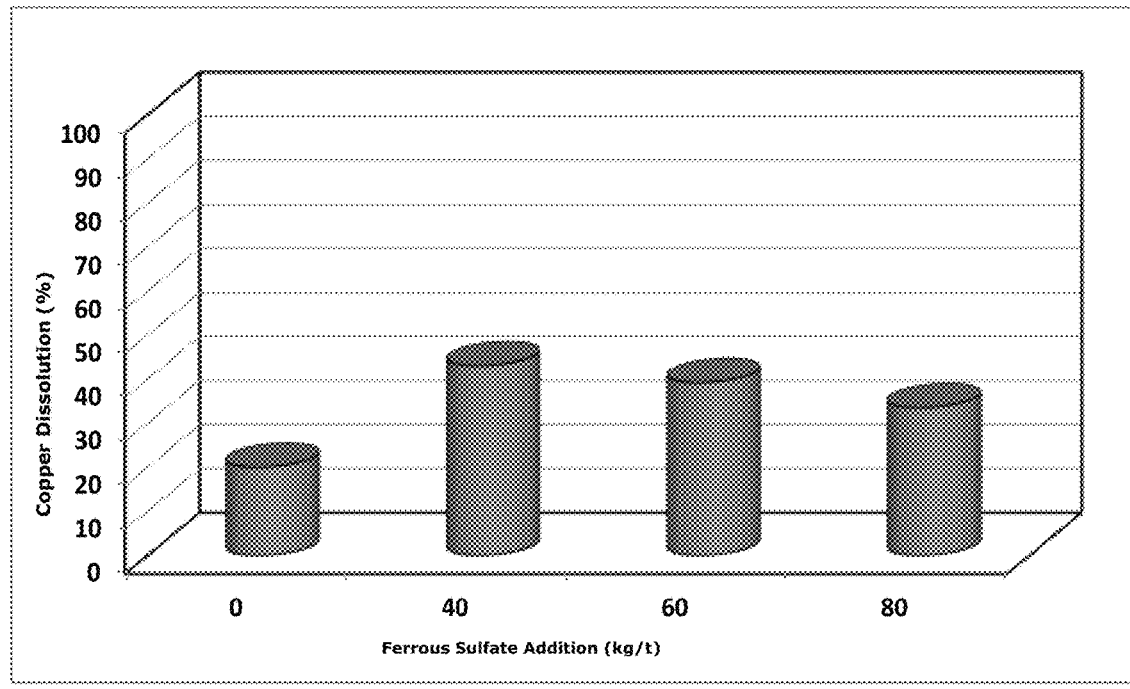
FIG. 16: Extraction of copper from a primary sulfide, using different concentrations of ferrous sulfate, in the stages of Reductive Activation and Autocatalytic Dry Reductive Transformation.

The results obtained in this test are shown in FIG. 16, allowing concluding that the concentration of iron sulfate has a beneficial effect on the dissolution of the primary sulfide, especially when the addition in the curing stage reaches 40 kg/t. It can be observed that without the presence of ferrous sulfate, a lower level of copper extraction is achieved, although the dissolution of the chalcopyrite and the gangue provides ferrous ions to the reaction. This provision will always take place due to the recirculation of solutions in an industrial process.

Therefore, in the reductive activation stage, with the addition of only sodium chloride the same beneficial effect could be produced, if the moisture required for the process can be reached using only recirculation solutions with a high content of ferrous ions.

Example 15: Extraction of Copper from a Primary Sulfide, Using Different Percentages of Moisture, During Autocatalytic Dry Reductive Transformation The mineral containing a primary copper sulfide in the form of chalcopyrite was crushed to a size 100% under ½". With this mineral, 5 samples were agglomerated and cured under the following conditions:
  a) Addition of 50 kg/t of sodium chloride;
  b) Addition of 40 kg/t of ferrous sulfate;
  c) Addition of 42 kg/t of sulfuric acid;
  d) Moisture of 4, 7, 10, 12 and 15%.

Then, the samples were subjected to a efflorescence time for 45 days, after which irrigation was applied with an acidulated solution at a pH of 1 for 12 hours at a rate of 5 L/h*m², and the effluent solutions were assessed for copper, allowing thus to compare the results of tests with different moisture levels during the curing stage.

Figure 17:
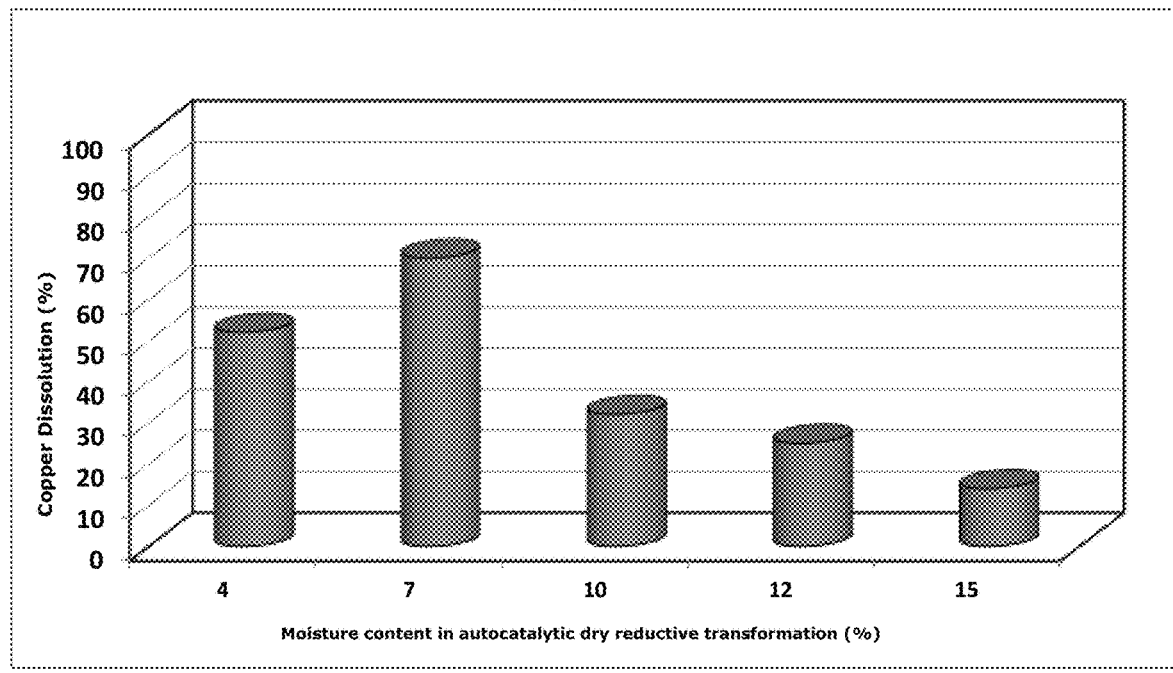
FIG. 17: Extraction of copper from a primary sulfide, using different percentages of moisture, in the Autocatalytic Dry Reductive Transformation stage.

The results obtained in these tests are shown in FIG. 17, allowing concluding that imposing a low total moisture to the mineral has a differentiating and beneficial effect on the dissolution of the copper contained in the primary sulfide. On the contrary, when a moisture higher than 10% is used, which is what normally happens in hydrometallurgical operations, copper extraction is significantly reduced. This condition of low moisture, that is, moisture of less than 10%, causes the salt concentrations to be increased by the loss of water, enhancing the reductive and supersaturation condition, significantly promoting the extraction of copper.

Example 16: Mineralogical Species in a Head Mineral and Mineralogical Species in Leach Ores, Under Different Periods of Autocatalytic Dry Reductive Transformation The results were obtained from tests developed using a low grade primary copper sulfide mineral (0.24%), which was subjected to a conventional crushing process to a size 100% under ½". With this mineral, 2 samples were agglomerated and cured under the following conditions:
  a) Addition of 80 kg/t of sodium chloride;
  b) Addition of 40 kg/t of ferrous sulfate;
  c) Addition of 42 kg/t of sulfuric acid;
  d) Moisture of 7%.

Then, the 2 samples were subjected to chemical activation and autocatalytic dry reductive transformation, for a term of 30 days in one case and 65 days in the other. After this time, in both cases, irrigation was applied with an acidulated solution at a pH of 1 for 12 hours at a rate of 5 L/h*m², and the effluent solutions were assessed for copper, allowing thus to determine the level of extraction reached at 30 and 65 days, respectively.

A mineralogical analysis of the head mineral under study indicated that copper was contained in the form of the following mineralogical species:

99.7% of copper as chalcopyrite; and
0.3% of copper as bornite.

In the case of leach ores, on the other hand, an optical mineralogical analysis was carried out similar to the one performed for the head mineral, which allowed establishing the manner in which the residual copper was present previously by the chemical analysis of these same leach ores.

Figure 18:
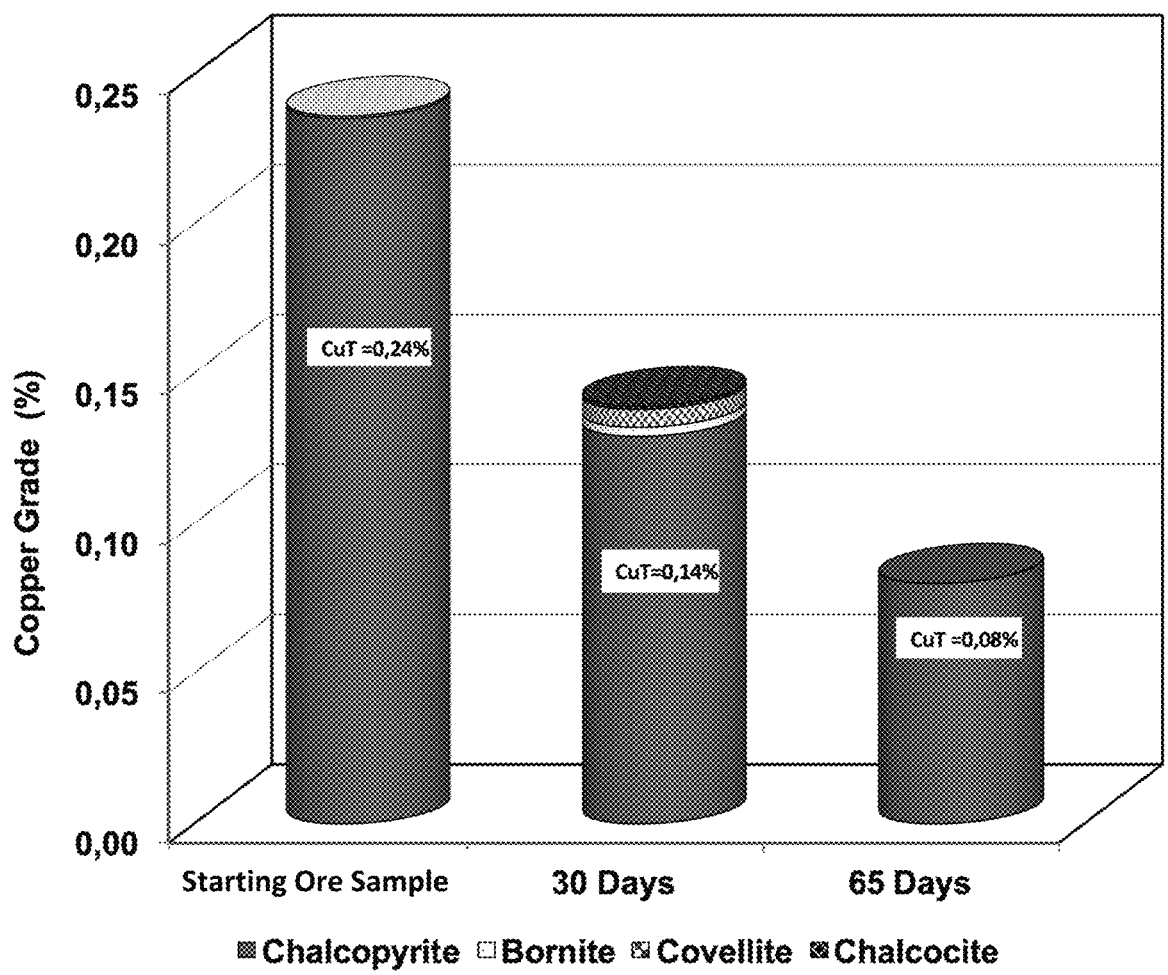
FIG. 18: Percentage of mineralogical species from a head mineral versus mineralogical species from intermediate tailings that was subjected to autocatalytic dry reductive transformation.

The results of the mineralogical analysis are shown in FIG. 18, where a first column can be seen indicating the mineralogical composition of the head mineral, which is characterized by having the percentages of chalcopyrite (99.7%) and bornite (0, 3%) as indicated above.

The second column shows the mineralogical composition of the leach ore associated with the 30-day efflorescence test with a partial chemical activation and autocatalytic dry reductive transformation, where it can be observed that the chalcopyrite was partially reduced to mineralogical species of bornite, chalcocite and covellite. On the contrary, for the third column that had 65 days of efflorescence and a complete period of chemical activation and autocatalytic dry reductive transformation, the presence of bornite, chalcocite and covellite is not observed, indicating that during Stages I and II the chalcopyrite was reduced to less refractory species and that in the same period were dissolved, showing that the process is autocatalytic. This phenomenon can be explained because through a REDOX process, the reducing agents generated in the reductive activation and autocatalytic dry reductive transformation can also participate as oxidizing agents, since they are REDOX pairs, achieving through reduction the transformation dissolution of the primary sulfide to less refractory species, which are dissolved in the same stage.

CONCLUSIONS FROM THE EXPERIMENTAL WORK

The main technical advantages of the present invention are based on the Stage of Reductive Activation and Autocatalytic Dry Reductive Transformation under supersaturation conditions, which promote a favorable environment for the transformation of the primary copper species to soluble species and less refractory sulfides, which are known and relatively easier to solubilize.

On the other hand, using ions in their reduced state as reducing agents, and ions in their oxidized state as oxidizing agents, allows that, in a window of low potential, reduction and oxidation processes can occur in the same stage and in a synergistic and autocatalytic manner, since the ions used are REDOX pairs.

Another advantage is that, for the convenience of the operation, more copper can be extracted in a shorter time, with a minimum moisture, with a low irrigation rate, lower operating costs and a lower consumption of water in the solution, as compared to the currently known conventional hydrometallurgical processes, which represents a powerful additional flexibility of the greatest technical, economic and environmental utility.

The results obtained differ from the currently available knowledge, which usually seeks to dissolve copper primary sulfide species by means of solid-liquid-gas or solid-liquid-gas-bacteria oxidative processes and in aqueous systems.

In this case, a different role of Reductive Activation of the mineral is proposed, in addition to a phenomenon of Dry Reductive Transformation into solid-solid. As a result of the proposed method, more copper is extracted than in conventional methods. Moreover, through the proposed method it is possible to achieve a lower consumption of water.

The process described in the presently claimed invention allows solving problems derived from the passivation of primary sulfide minerals containing copper, based mainly on the first stage or Reductive Activation Stage, which allows the mineral to be conditioned and generate a destabilization of the surface of the primary sulfide, releasing copper ions necessary for the Dry Reductive Transformation stage.

The benefits of Reductive Activation are essential for the Dry Reductive Transformation stage to be carried out efficiently, where a transformation of the chalcopyrite occurs under solid-solid, supersaturation and low moisture conditions, transforming the primary sulfide into highly soluble species and non-stoichiometric sulfides and less refractory to leaching. The effect of passivation is minimized, since the products generated during the Dry Reductive Transformation stage are not mainly sulfur, but also acid-soluble sulfides and oxidizing agents.

The foregoing specification is provided for illustrative purposes only and is not intended to describe all possible aspects of the present invention. While the invention has been shown in the present document and has been described in detail in relation to several exemplary embodiments, those persons skilled in the art will appreciate that minor changes to the description and various other modifications, omissions and additions do not depart from the spirit and scope of the same.

The invention claimed is:
1. A process for the solubilization of metals from minerals and/or concentrates of sulfide minerals of origin metallogenically primary which contain the metals, wherein the process comprises the following stages:
(I) stage of Reductive Activation, which corresponds to a non-oxidative stage that includes contacting the mineral or mineral concentrate with sulfuric acid; chloride ions in acidic environment, which are added in the form of sodium chloride in an amount that ranges from 25 to 80 kg per ton of material; and with recirculating solutions which contain or may contain chloride, ferrous iron and copper ions, always in an environment of potential up to 500 mV versus Ag/AgCl and a final moisture of an agglomerated mineral lower than 10%; and
(II) stage of Autocatalytic Dry Reductive Transformation, solid-solid, where reductive conditions are enhanced by the efflorescence phenomenon, which promotes an oversaturated environment of chloride, ferrous iron and copper ions, causing the minerals and/or concentrates of sulfide minerals to be reduced to mineralogical species which are solubilized by acid and chloride, this stage concludes with a washing with process recirculating solutions, which allows removing the metals;
wherein stages I and II are repeated one or more successive times.

2. The process according to claim 1, wherein in stage I ferrous iron is added so as to have an amount of 10 to 50 kg of ferrous ion per ton of material.

3. The process according to claim 2, wherein in stage I the ferrous iron is added in the form of sulfate ferrous and/or ferrous hydroxide, and/or through the contents of ferrous ion of the process recirculation solutions.

4. The process according to claim 1, wherein in stage I the addition of sulfuric acid ranges from 5 to 50 kg per ton of material.

5. The process according to claim 1, wherein in stage I the final moisture must be between 4 and 8%.

6. The process according to claim 1, wherein in stage II a final moisture must be lower than 10%.

7. The process according to claim 6, wherein in stage II the final moisture must be between 4 and 8%.

8. The process according to claim 1, wherein the redox potentials controlling both stages of Reductive Activation and Autocatalytic Dry Reductive Transformation which condition autocatalysis range between 250 and 500 mV versus Ag/AgCl.

9. The process according to claim 1, wherein after the entry of water, acid and salts in stage I the mixture obtained is left in a non-irrigated status to activate the surface of the mineral for a time ranging from 5 to 90 days, promoting the second stage of Autocatalytic Dry Reductive Transformation, through the phenomenon of efflorescence.

10. The process according to claim 1, wherein after stage II the mineral is washed by a continuous or intermittent irrigation with a solution containing chloride, ferrous and copper ions.

11. The process according to claim 10, wherein the metal to be solubilized is copper.

12. The process according to claim 1, wherein after stage II the washing solutions are drained in order to enable a continuation of a new autocatalytic dry reductive transformation stage in a reductive environment with a final moisture of the agglomerated mineral lower than ten percent.

13. The process according to claim 1, wherein the metals to be solubilized are selected from the group consisting of copper, zinc, nickel, molybdenum, cobalt, and lead.

14. The process according to claim 1, wherein before stage I the mineral is fractured.

15. The process according to claim 1, wherein stage I of Reductive Activation and stage II of Autocatalytic Dry Reductive Transformation is applied to copper concentrates.

* * * * *